A. R. MONRO & H. BEATTY.
EQUILIBRIUM ATTACHMENT FOR AEROPLANES.
APPLICATION FILED JULY 13, 1910.
1,014,082. Patented Jan. 9, 1912.
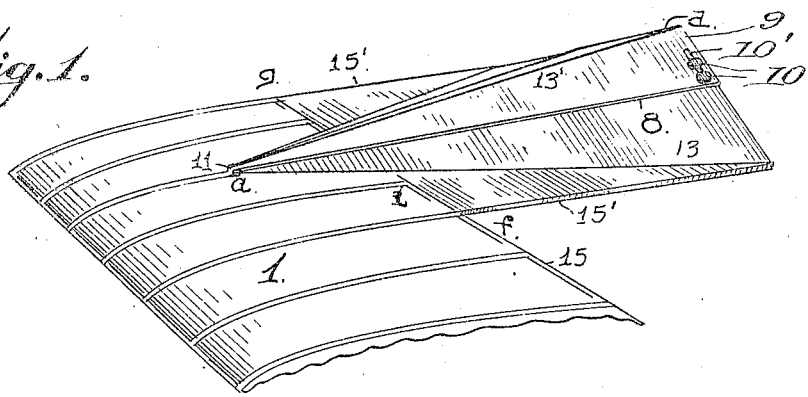
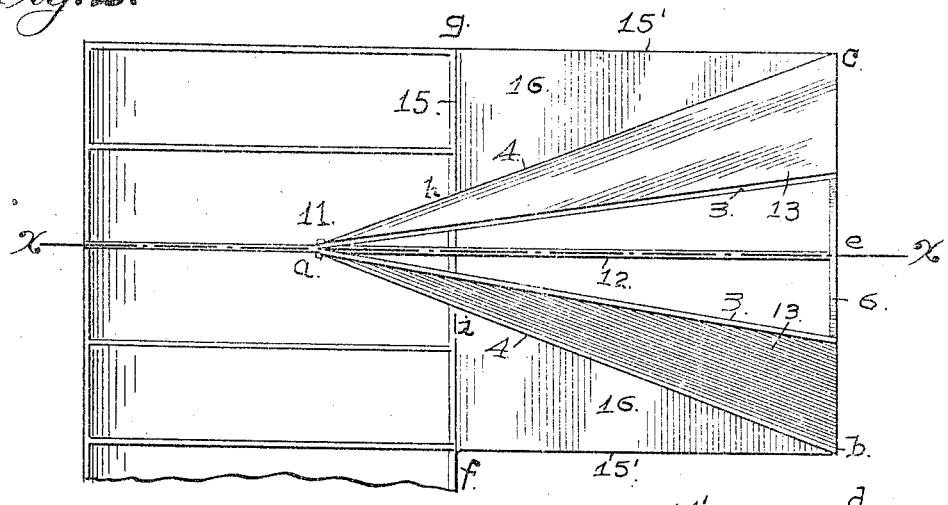
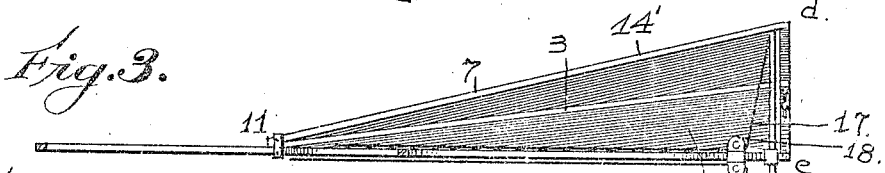
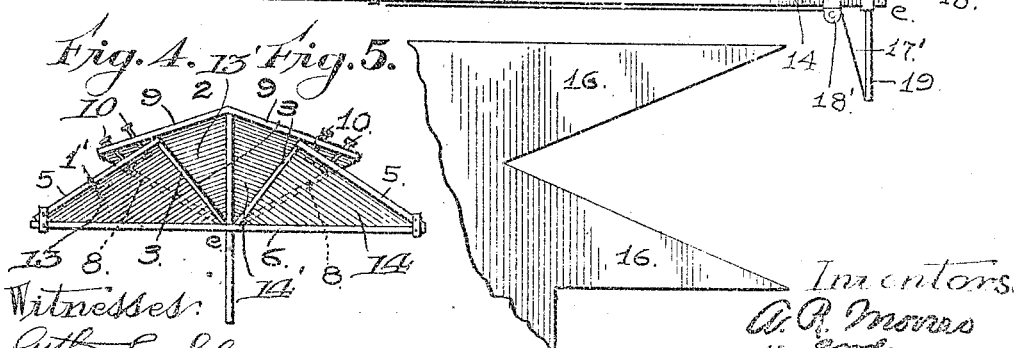

UNITED STATES PATENT OFFICE.

ARTHUR RANDOLPH MONRO AND HAROLD BEATTY, OF BERKELEY, CALIFORNIA.

EQUILIBRIUM ATTACHMENT FOR AEROPLANES.

1,014,082.  Specification of Letters Patent.  Patented Jan. 9, 1912.

Application filed July 13, 1910. Serial No. 571,749.

*To all whom it may concern:*

Be it known that we, ARTHUR RANDOLPH MONRO and HAROLD BEATTY, citizens of the United States, residing at Berkeley, in the county of Alameda and State of California, have invented certain new and useful Improvements in Equilibrium Attachments for Aeroplanes, of which the following is a specification.

The hereinafter described invention relates to an attachment for controlling the equilibrium of aeroplanes for the maintenance of stability in connection with aerial flights; the object of the invention being to provide a simple, effective, and operative device for automatically controlling the equilibrium of aeroplanes under the varying conditions of changing currents to which vessels of this character are subjected while in action, thus relieving the operator thereof of the necessity of caring for the said vessel so far as relates to maintaining its equilibrium during the course of a flight.

To comprehend the invention, reference should be had to the accompanying sheet of drawings wherein—

Figure 1 is a perspective view of the invention as applied to one of the sustaining planes of an aeroplane. Fig. 2 is a plan view of the attachment with its adjustable section removed from the aeroplane. Fig. 3 is a longitudinal section taken on the line $x$—$x$ Fig. 2 of the drawings. Fig. 4 is a rear elevation of the attachment. Fig. 5 is a detail broken plan view of an aeroplane plane illustrating the position of the horizontal planes of the attachment applied thereto.

In the drawings, the numeral 1 is used to designate one of the sustaining planes or wings of an aeroplane, the direction of its line of travel being indicated by the arrow, Fig. 1 of the drawings. While only one of the said sustaining planes is illustrated, it will be understood that the hereinafter described invention is applied to each plane of the aeroplane.

The equilibrium attachment comprises two covered sides of a triangular isosceles based hollow pyramid, so placed that the vertex thereof is relatively in front of its substantially horizontal base and that the third and substantially perpendicular uncovered isosceles triangular side is relatively downward to the whole in the general direction of the line of flight. The equilibrium pocket is preferably formed with a relatively fixed lower section and an adjustable upper section, the frame of the fixed section consisting of the upper forwardly and downwardly extended convergent pieces 3, the lower forwardly extended convergent horizontal base pieces 4, and the upwardly extended inwardly inclined rear brace pieces 5 which unite the rear ends of the frame pieces 3 and 4, and the said brace pieces 5 are connected at their lower ends to the transverse base piece 6, Figs. 2 and 4 of the drawings. On the double triangular frame thus formed is mounted for vertical adjustment the upper section of the equilibrium pocket, which consists of the forwardly extended downwardly inclined ridge piece 7, the forwardly and downwardly extended convergent base pieces 8, and the upwardly extended inwardly inclined rear brace pieces 9, which connect the base pieces 8 to the ridge piece 7, and the said brace pieces 9 are slidably mounted on the rear brace pieces 5 of the lower fixed sections, being held thereto by the guide pins 10 extended through slots 10' cut in the brace pieces 9, the width of the slots 10' being sufficient to allow for the slight swinging movement of the upper section as raised and lowered. The forwardly extended pieces 3, 4, 7 and 8 are united at point 11 by being hinged to a rod 12 secured to the under face of the sustaining plane 1 of the aeroplane, the said rod being extended beyond the rear edge of the plane 1 to a distance coextensive with the overhang of the equilibrium pocket attachment and connected to the rear transverse brace piece 6. The frame is constructed of wood or other suitable material possessing the requisite lightness, rigidity, and durability. Of the frame, $d$ designates the highest point of the ridge 7, and $a$ the lowest point thereof, while $b$ indicates the left rear corner of the device, and $c$ the right rear corner. The center of the rear brace 6 is designated by the reference letter $e$. The inclined vertically disposed convergent triangular planes of the sides of the pocket frames lying within the area bounded by $a$, $b$, $d$, and $a$, $c$, $d$, are closed respectively by the canvas or other suitable covering 13, 13', 14, 14', so that when covered there is formed a V-shaped pocket consisting of triangular sides, formed of a relatively stationary section and an upper adjustable section, the planes of the sides intersecting each other on the line $a$, $d$, and the bottom of the pocket being opened. The pocket as thus formed is placed in a so-called pocket plane, lying within the area bounded by $g$, $f$, $b$, $c$, and consisting of two horizontally disposed triangular planes $f$, $i$, $b$, and $g$, $h$, $c$, each being formed by the transverse frame piece 15, and the right angle extension piece 15' springing therefrom, which extension pieces are united to the rear brace piece 6 at the right and left rear corners of the V-shaped pocket. Each of the said horizontal planes is closed by a canvas or other suitable covering 16, and serve to provide right angle triangular supporting extension surfaces to the open bottomed pocket for increasing its resistance and adding to its usefulness in the maintenance of equilibrium for the aeroplane to the sustaining planes of which the attachment is secured. When positioned relative to the sustaining planes of the aeroplane, the transverse frame piece 15, for the horizontal triangular planes is attached to the rear supporting rod 16', of the said sustaining planes of the aeroplane, and the attachment extends rearwardly to overhang to approximately its full length the plane to which it is applied. When so applied, the area bounded and indicated by $c$, $h$, $i$, and $b$, being uncovered, an equilibrium pocket is provided which gradually increases in height to a pre-determined degree and is situated in a plane above that of the sustaining plane of the aeroplane, the apex of the pocket being placed in the direction of the aeroplane's line of travel. Preferably, when the device is attached to the sustaining plane of an aeroplane, the positioning thereof is such that the equilibrium attachment is at the tips of the sustaining planes, to the rearward thereof with its base in the general plane of the supporting sustaining planes of the aeroplane, so that the front edge $g$—$f$ thereof coincides with the rear right and left corners of the said sustaining plane 1.

The upper section of the pocket is not adjusted bodily relative to the lower fixed section of the said pocket, inasmuch as the forward end of the said sections meet at substantially a common point 11, where they are hinged to a rod 12 secured to the under face of the sustaining plane 1 of the aeroplane and extended therefrom rearwardly to a distance co-extensive with the overhang of the equilibrium attachment. The movement of adjustment for the upper section is a swinging one, the forward end turning on the pivotal joint, while the vertical movement at the outer end of the said upper section is of a limited character, being approximately six inches. While during this swinging movement of the upper section the parts 9 are moved out of parallelism with the parts 5, the variation is so slight as to be easily compensated for by the loose play allowed for in the connection between said parts.

The adjustability of the movable section of the pocket attachment is controlled by the operator of the aerial craft by means of the operating cords 17 and 17', the former of which is extended from the rear end of the ridge 7, downwardly under the pulley 18 to within convenient reach of the operator, while the cord 17' is extended from the lower end of a support 19, projecting from the adjustable section beyond the base of the pocket, passing upwardly over the pulley 18' to within convenient reach of the operator. A pulling strain exerted on the cord 17 lowers the movable section relative to the fixed section and reduces the height of the pocket, while a similar strain exerted onto the opposing cord 17' raises the movable section to any point within the limit of its vertical adjustability.

The pockets as constructed and arranged to overhang the sustaining planes of the aeroplane, act to overcome the tendency of the vessel during flight to tilt due to the varying air currents acting against the surface of the sustaining planes and thus serves to automatically maintain the equilibrium of the aeroplane.

Having thus described the invention what is claimed as new and desired to be protected by Letters Patent is—

1. The combination with the sustaining planes of an aeroplane, of an equilibrium attachment secured to and overhanging the rearward edge thereof, the same comprising an open bottomed pocket formed of two triangular sides situated with its apex in the direction of travel and the base thereof being in approximately the horizontal plane of the sustaining plane of the aeroplane.

2. The combination with the sustaining planes of an aeroplane, of an equilibrium attachment secured to and overhanging the rear edge thereof, the same comprising an open bottom air receiving pocket formed of two triangular sides arranged at an upward inclination and situated relative to the sustaining plane with its apex in the direction of travel and its base in approximately the horizontal plane of the said sustaining planes, and laterally disposed horizontal sustaining planes extended from the base of the said pocket.

3. The combination with the sustaining planes of an aeroplane, of an equilibrium attachment secured to the rear edge portion thereof, the same comprising an open bottomed pocket consisting of a relatively fixed body section and a top section adjustable thereon, and means for imparting adjustment to the top section of the pocket to vary the height thereof to the surface of the sustaining planes.

4. The combination with the sustaining plane of an aeroplane, of an equilibrium attachment secured to and situated at the lateral extremities thereof, the same comprising an open bottomed substantially V-shaped pocket composed of two triangular sides, and laterally disposed horizontal sustaining planes extended from the base of the pocket, the closed forward end of the open bottomed pocket being situated in the direction of the movement of the aeroplane.

5. An equilibrium attachment for the sustaining planes of an aeroplane, the same comprising an open bottomed substantially V-shaped pocket composed of a relatively fixed body section and an adjustable top section, the sides of each section being triangular in form, means for adjusting the top section for varying the height of the pocket, and laterally disposed horizontal sustaining planes extended from the base of the said pocket.

6. An equilibrium attachment for the sustaining planes of an aeroplane, the same comprising an open bottomed pocket consisting of a relatively stationary body section and an adjustable top section sustained thereby, and means for imparting adjustment to said top section to vary the height of the pocket.

7. The combination with the sustaining planes of an aeroplane, of an equilibrium attachment secured to and overhanging the rearward edge thereof, the same comprising an open bottomed pocket situated with its forward edge in the direction of travel, and the base thereof being approximately in the same horizontal plane as that of the sustaining plane of the aeroplane.

8. The combination with the sustaining planes of an aeroplane, of an equilibrium attachment secured to and overhanging the rearward edge thereof, the same comprising an open bottomed pocket situated with its forward edge in the direction of travel, and the base thereof being approximately in the same horizontal plane as that of the sustaining plane of the aeroplane, and horizontally disposed planes laterally extended from the base of the said pocket.

9. The combination with the sustaining plane of an aeroplane of an equilibrium device located at approximately the lateral extremities thereof, the same comprising an open bottomed pocket provided with a closed forward end and an open rear end, the closed forward end being situated in the direction of the movement of the aeroplane.

10. The combination with the sustaining plane of an aeroplane, of an equilibrium attachment located at approximately the lateral extremities thereof to overhang the edge of the sustaining plane, the same comprising an open bottomed pocket provided with an open rear end and a closed forward end, the closed forward end being situated in the direction of the movement of the aeroplane.

11. The combination with the sustaining plane of an aeroplane, of an equilibrium attachment, the same comprising the half of a square hollow pyramid divided in the plane of a diagonal of its base, and placed with its open side down and its axis fore and aft, the vertex being forward, on the end of a plane, and the plane cut away immediately beneath the device to form an open rear end to the pocket.

In testimony whereof we have signed our names to this specification in the presence of two subscribing witnesses.

ARTHUR RANDOLPH MONRO.
HAROLD BEATTY.

Witnesses:
ROBERT R. RUSS,
JOS. B. DUGGAN.